United States Patent

[11] 3,547,382

| [72] | Inventor | Robert M. Stanley<br>Denver, Colo. |
|---|---|---|
| [21] | Appl. No. | 729,064 |
| [22] | Filed | May 14, 1968<br>Continuation-in-part of Ser. No. 600,487, Dec. 9, 1966, Patent No. 3,433,440, and a continuation-in-part of Ser. No. 605,121, Dec. 12, 1966, Patent No. 3,424,409 which is a continuation-in-part of Ser. No. 390,709, Aug. 19, 1964, abandoned. |
| [45] | Patented | Dec. 15, 1970 |
| [73] | Assignee | Stanley Aviation Corporation<br>Aurora, Colo.<br>a corporation of New York |

[54] APPARATUS FOR REMOVING A CREW COMPARTMENT ENCLOSURE STRUCTURE FROM AN AIR OR SPACE VEHICLE
6 Claims, 6 Drawing Figs.

[52] U.S. Cl. .................................................. 244/121,
244/137; 89/1.8
[51] Int. Cl. ...................................................... B64c 1/32
[50] Field of Search ........................................... 244/121,
122, 136, 137; 89/1.813, 1.814, 38; 102/34, 89, 63

[56] References Cited
UNITED STATES PATENTS

| 2,751,171 | 6/1956 | Martin | 244/122X |
|---|---|---|---|
| 2,970,793 | 2/1961 | Beem et al. | 244/122(17)X |
| 2,992,793 | 7/1961 | Devantier | 244/137X |
| 3,152,781 | 10/1964 | Martin | 244/122(17) |
| 3,218,927 | 11/1965 | Stott | 244/137X |
| 3,248,072 | 4/1966 | Schimmel | 244/1 |
| 3,355,127 | 11/1967 | Stanley et al. | 244/122(13) |
| 3,361,397 | 2/1968 | Valentine | 244/122(13) |

FOREIGN PATENTS

| 1,065,369 | 1/1954 | France | 244/122(17)UX |

*Primary Examiner*—Milton Buchler
*Assistant Examiner*—Jeffrey L. Forman
*Attorney*—Strauch, Nolan, Neale, Nies & Kurz ABSTRACT: An apparatus for removing an overhead crew compartment enclosure structure from an air or space vehicle comprising a rocket mounted in the vehicle and connected to the enclosure structure by an extensible, motion-transmitting towline. The rocket is launched through an egress opening selectively formed in the enclosure structure and is ignited for flight away from the vehicle to extract the enclosure structure from the vehicle, thereby providing an escape opening for crewmen in the compartment.

INVENTOR.
ROBERT M. STANLEY

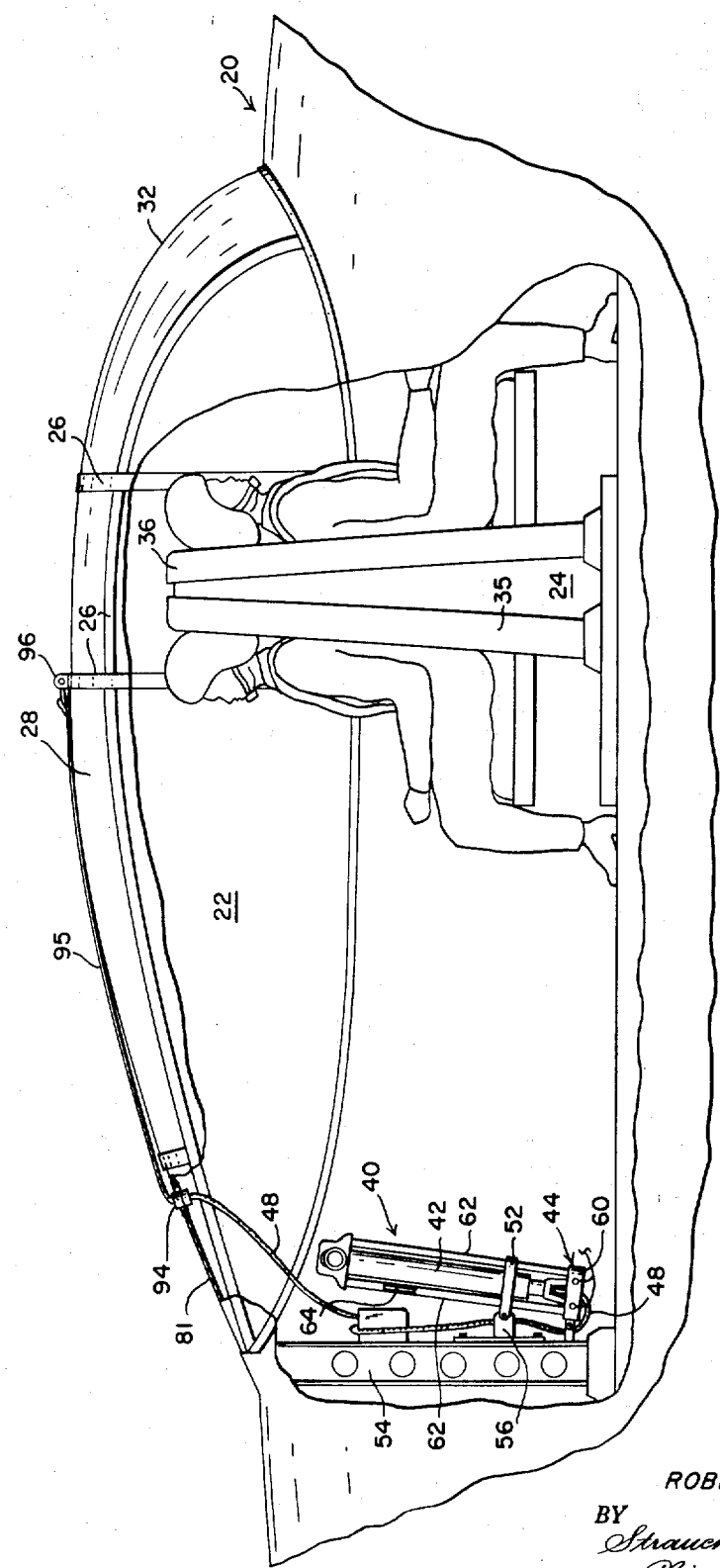

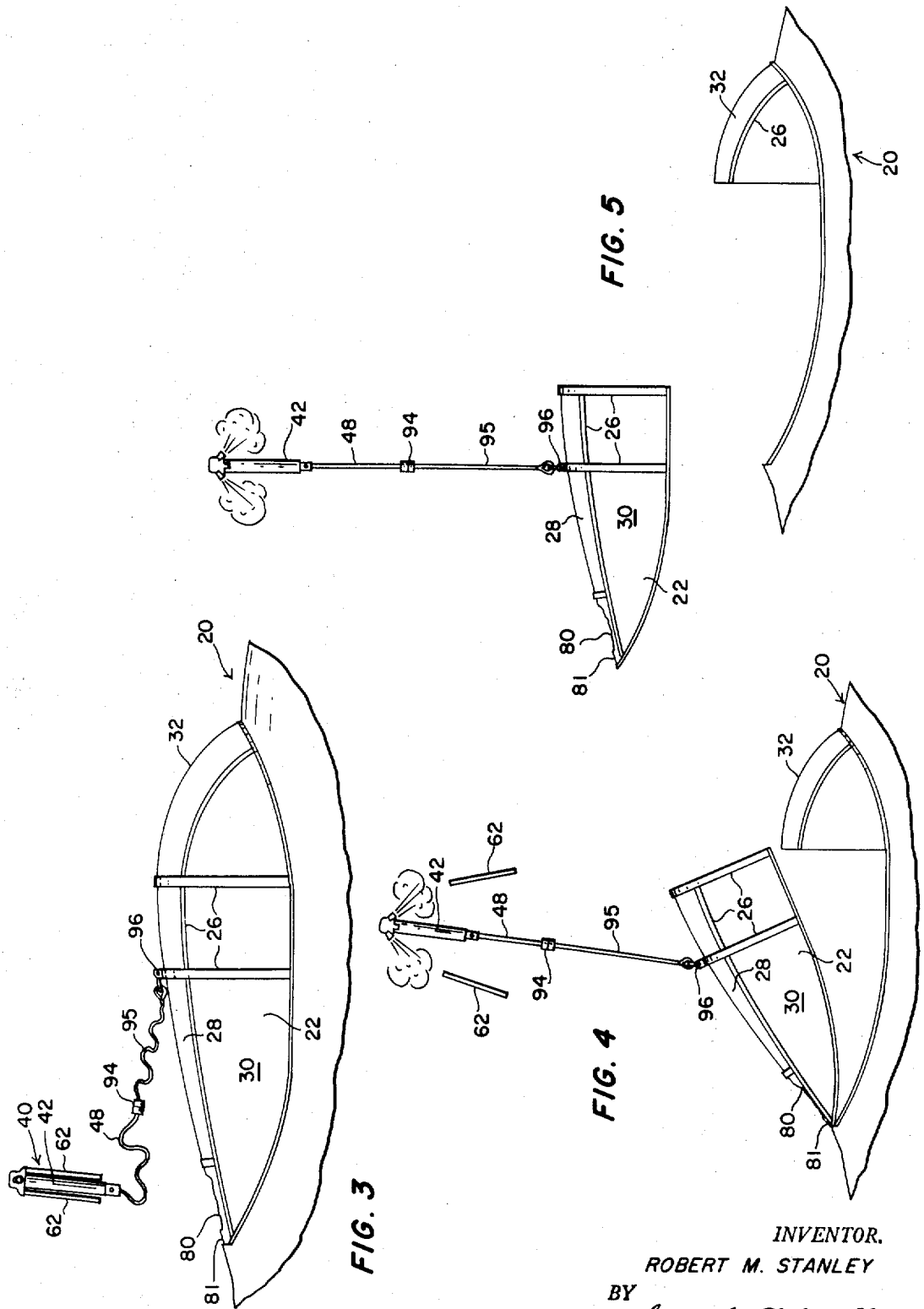

3,547,382

APPARATUS FOR REMOVING A CREW COMPARTMENT ENCLOSURE STRUCTURE FROM AN AIR OR SPACE VEHICLE

RELATED APPLICATIONS

This application is a continuation-in-part of my copending application Ser. No. 600,487 filed on Dec. 9, 1966, now U.S. Pat. No. 3,433,440, for Erector and Positioning Devices for Air Crew Escape System rocket and my copending application Ser. No. 605,121 filed Dec. 12, 1966, now U.S. Pat. No. 3,424,409, for Occupant Escape Apparatus for an Aircraft or the Like, the latter being a continuation of the now abandoned application Ser. No. 390,709 filed on Aug. 19, 1964 and having the same title.

FIELD OF INVENTION

This invention relates to an apparatus for removing a load from a vehicle and more particularly to a rocket powered apparatus for effecting the removal of an overhead crew compartment enclosure structure or canopy from an air or space vehicle.

BACKGROUND

The conventional crewman escape route in certain types of aircrafts such as the Navy A3 and RA3B is in a downward direction through an escape hatch in the floor. Such a downward escape route is more hazardous as compared with an upward escape route particularly when the disabled aircraft is descending. Prior to this invention, an upward escape route for the types of aircrafts mentioned above was precluded mainly owing to the fact that no simplified, reliable apparatus had been developed to quickly and safely remove the overhead enclosure structure particularly at low aircraft speeds.

SUMMARY OF INVENTION, OBJECTS AND DESCRIPTION OF DRAWINGS

In overcoming the foregoing problems, the primary object of this invention is to provide a novel apparatus whereby the overhead enclosure structure or canopy or other load is safely and quickly removed from the vehicle to a region where it does not obstruct an upward escape route or interfere with the opening of the crewman's parachute.

The foregoing is accomplished by providing a rocket mounted in the vehicle and connected to the overhead enclosure structure by an extensible, motion-transmitting towline. To effect the removal of the overhead structure, a window in the overhead structure is selectively cut away to form an egress opening through which the rocket is selectively launched for flight away from the vehicle. During the rocket flight, the towline is extended, and upon predetermined stretch of the towline, the overhead structure is at least partially freed from the vehicle as by detonating linear-shaped charges or the like around the framed portion joining the overhead structure to the body of the vehicle. Continued flight of the rocket thus extracts the overhead structure from its position on the vehicle and carries it a safe distance away from the vehicle. As a result, an escape opening is provided for enabling the crewmen to make an upward escape.

Accordingly, a more specific object of this invention is to provide a novel apparatus for removing an overhead crew compartment enclosure structure wherein a rocket mounted in the vehicle is connected by a motion transmitting towline to the overhead structure and is launched through an egress opening formed in the overhead structure for flight away from the vehicle to exert, upon ignition, an extraction force to pull the overhead structure from its position on the vehicle body and to carry it a safe distance away from the vehicle to allow crewmen in the vehicle to make an upward escape.

Further objects of this invention will appear as the description proceeds in connection with the appended claims and annexed drawings wherein:

FIG. 2 is a fragmentary side elevation of the aircraft shown in FIG. 1 with the aircraft body partially broken away to illustrate interior details;

Figure 6:
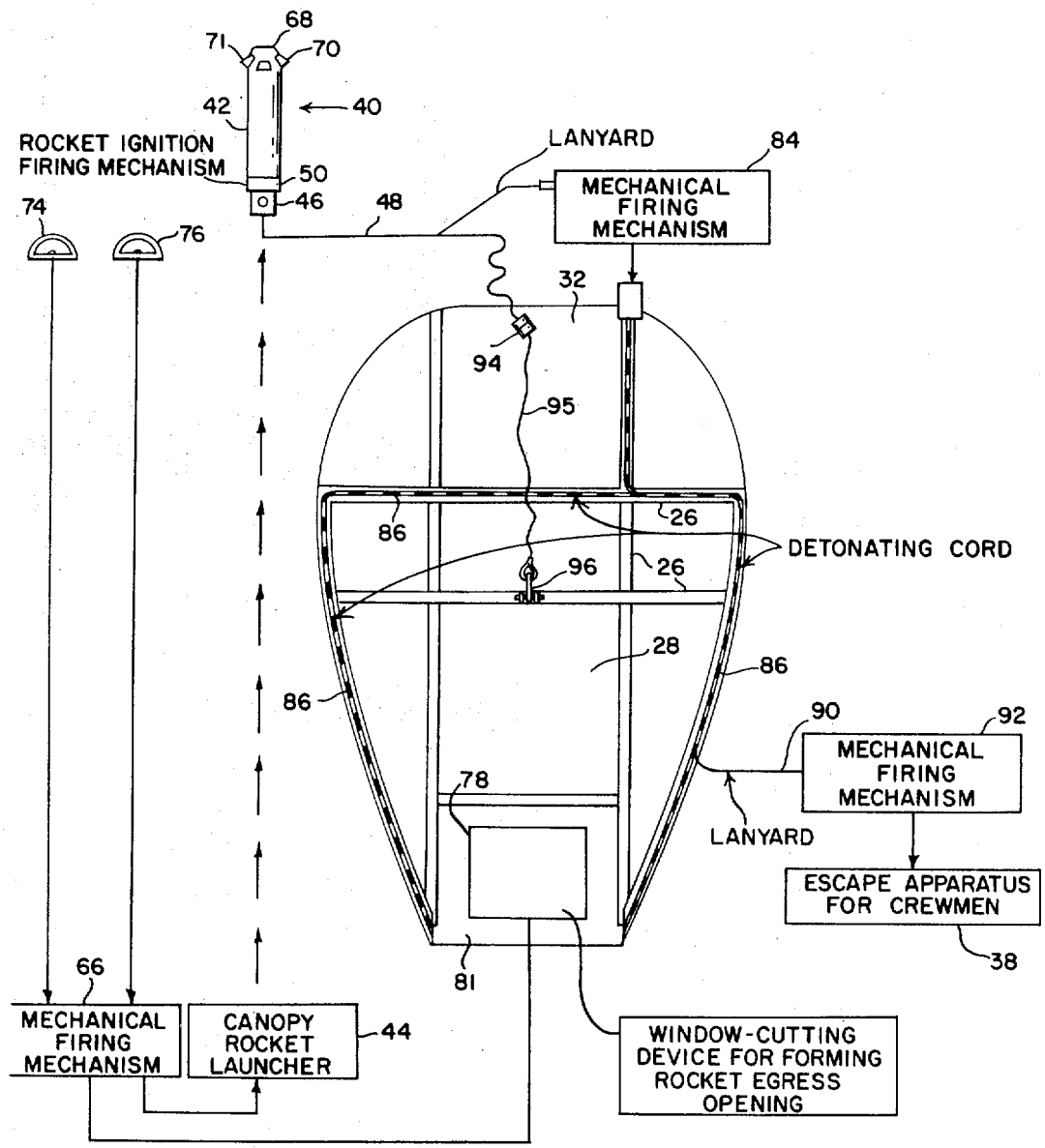

FIGS. 3, 4, and 5 are side elevations similar to FIG. 2, and together with FIG. 2 illustrate the preferred sequence of steps for extracting the overhead enclosure structure from its position on the aircraft; and FIG. 6 is a schematic view of the apparatus for removing the overhead enclosure structure shown in the previous FIGS.

DETAILED DESCRIPTION

Although the present invention is described herein to be incorporated into an aircraft, it will readily be appreciated that it is equally applicable to numerous other forms of vehicles, such as space vehicles, for example.

Figure 1:
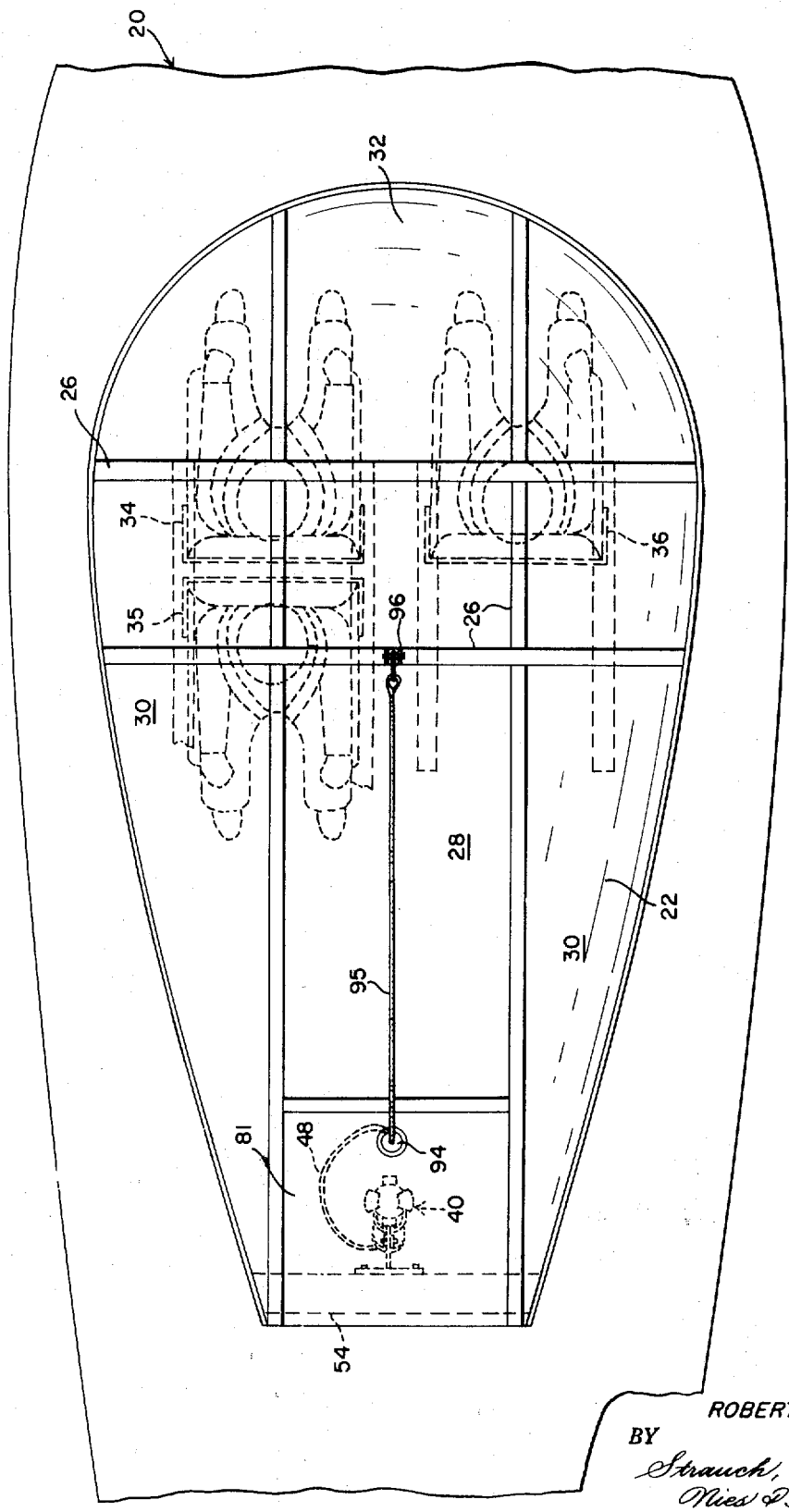
FIG. 1 is a fragmentary top plan view of an aircraft incorporating the apparatus of this invention.

Referring now to the drawings, and more particularly to FIGS. 1 and 2, the reference numeral 20 generally designates an aircraft of the Navy A3 type having a conventional crew compartment overhead enclosure structure or canopy 22 for enclosing a crew compartment indicated at 24. Overhead structure 22 is rigidly joined to the frame of the aircraft and comprises a plurality of structural members 26 which frames a plurality of windows including an overhead window 28 and side windows indicated at 30. Overhead structure 22 is joined to and cooperates with a front windshield 32 to enclose compartment 24 such that it may be pressurized in a conventional manner.

Structure 22 is not of the type that can be unlatched and raised to allow crewmen to enter and leave the aircraft during normal conditions. Instead it is permanently joined to windshield 32 and to the aircraft body, requiring the structural parts securing structure 22 in place to be cut or otherwise destroyed to free the overhead structure from the aircraft body.

In this embodiment, compartment 24 contains three seats 34, 35, and 36 respectively for the pilot, navigator, and bombardier. Each of these crewmen is equipped with an escape apparatus indicated at 38 in FIG. 6. Although apparatus 38 may be of any conventional, suitable form, it preferably is of the type described in my copending application Ser. No. 605,121 or in U.S. Letters Pat. No. 3,355,127 issued Nov. 28, 1967. Apparatus 38 provides an upward escape for each crewman. The rocket-powered system for removing enclosure structure 22 to unblock the upward escape route is generally indicated at 40 (FIG. 6) and will now be described.

As shown in FIGS. 1 and 2, system 40 comprises a tractor-type rocket 42 and a rocket launcher 44. Rocket 42 is preferably of the same construction described in the first embodiment of my copending application Ser. No. 605,121. This rocket also is described in U.S. Letters Pat. No. 3,361,397 issued on Jan. 2, 1968 and in U.S. Letters Pat. No. 3,355,127. Launcher 44 preferably is of the same construction as that described in the first embodiment of my copending application Ser. No. 605,121 and also in U.S. Pat. No. 3,361,397.

As best shown in FIG. 6, a swivel joint 46 mounted on the aft end of rocket 42 is connected by a motion-transmitting towline 48 to enclosure structure 22. As described in U.S. Pat. No. 3,361,397 and also in my copending application Ser. No. 605,121, rocket 42 is launched in an unignited condition by launcher 44. This unignited rocket flight extends towline 48 to a tensioned, motion-transmitting condition which actuates the rocket ignition firing mechanism indicated schematically at 50 in FIG. 6. Mechanism 50 may be of the same type as described in U.S. Pat. No. 3,361,397 or in the first embodiment of my copending application Ser. No. 605,121.

As best shown in FIG. 2, rocket is mounted in the rear of compartment 24 and is supported by a plurality of suitably constructed brackets 52. Brackets 52 may be rigidly fixed to a bulkhead 54 by a structural member 56. Alternatively, rocket 42 together with its launcher 44 may be mounted in the manner generally described in the first embodiment of my copending application Ser. No. 605,121.

As fully described in U.S. Pat. No. 3,361,397 as well as the first embodiment of my copending application Ser. No. 605,121, launcher 44 comprises a rigid housing 60 (see FIG. 2) which mounts a pair of launching tubes 62 on diametrically opposite sides of rocket 42. Rocket launching push rods 64 (one shown in FIG. 2) slidably received in launching tubes 62 are detachably connected to rocket 42 to support rocket 42 in compartment 24. Launching tubes 62 are rigidly fixed to brackets 52 and to housing 60.

Unshown conventional cartridges mounted in housing 60 and forming a part of launcher 44 are ignited by a conventional mechanical firing mechanism 66 (see FIG. 6). The expanding gases generated by the ignition of these cartridges pass into launching tubes 62 and act on the inner ends of push rods 64 to forcibly catapult the assembly of rocket 42 and push rods 64 upwardly.

As shown, rocket 42 comprises a nozzle assembly 68 which is mounted on the forward or advancing end of the rocket casing and which comprises a hollow nose cap housing having a pair of rearwardly and outwardly directed nozzles 70 and 71. The gases generated by burning propellant stored within the rocket casing are thus exhausted through the passages defined by nozzles 70 and 71 to effectively pull rocket 42 through the air.

To initiate an escape with the apparatus thus far described, the pilot pulls a conventional escape initiation control handle 74 (see FIG. 6) which is operatively connected to actuate firing mechanism 66. A second control handle 76 may also be provided to facilitate actuation of firing mechanism 66 by the bombardier or other crew member. Actuation of firing mechanism 66 almost immediately activates a window cutting device comprising any suitable means such as a mild detonating cord indicated at 78 in FIG. 6. Detonation of cord 78 cuts an egress opening or exit hole 80 in an overhead window 81 (FIG. 1), forming a part of structure 22. Window 81 forms an extension of window 28 at the rear of structure 22 as shown. Window 28, in this embodiment provides a hatch opening facilitating normal or nonemergency ingress and egress of the crewmen.

Actuation of firing mechanism 66 also almost immediately activates the unshown cartridges in rocket launcher 44. The gases generated by ignition of the unshown rocket launcher cartridges forcibly launch rocket 42 in the manner previously described.

As shown, rocket is so mounted that its upward launching path is at a slightly forwardly inclined acute angle from a vertical axis. The rocket launching path is in a vertical plane passing through the symmetrical axis of the aircraft and containing the longitudinal axis of rocket 42. Ignition of the unshown cartridges in launcher 44 launches rocket 42 in unignited condition along its inclined launch path for upward flight passing through opening 80 as best shown in FIG. 3.

In addition to providing a free path for launching the rocket from its position within compartment 24, the formation of opening 80 also relatively slowly and safely depressurizes compartment 24 preparatory to the removal of the crewmen.

The unignited flight of rocket 42 through opening 80 and away from aircraft 20 extends towline 48. As the towline approaches its extended condition where it becomes taut to provide a tensioned, motion-transmitting connection, it ignites the rocket and actuates a conventional mechanical firing mechanism 84 of any suitable form. Actuation of firing mechanism 84 immediately ignites a mild detonating cord 86 or suitable, linear-shaped charges along the forward edge of enclosure 22 where it is joined to windshield 32 and along its sides where it is joined to the frame of the aircraft. Actuation of mechanism 84 also ignites shaped charge cutters at major structural members. Ignition of these cutters frees enclosure 22 from the aircraft except at its rearward end where it is secured to the aircraft frame by the uncut skin indicated at 88 in FIG. 4.

As a result of igniting the main body of rocket propellant, rocket 42 continues its flight away from aircraft 20. The ignited rocket extraction force exerted through the now tensioned towline 48 is applied to the now partially freed enclosure structure to swing it upwardly and rearwardly about the uncut skin at 88 as best shown in FIG. 4. The wind blast resulting from the movement of the aircraft now tends to rotate enclosure structure 22 about an axis at 88 to about a 45° angle from a horizontal plane. At this time, a lanyard 90 which is secured to enclosure structure 22 is tensioned to actuate a conventional mechanical firing mechanism 92. Actuation of firing mechanism 92 initiates the crew escape system sequence. Further motion of the canopy tears away the uncut skin at 88, and the continued ignited flight of rocket 42 away from the aircraft carries enclosure structure 22 upwardly and away from the aircraft to location where it is safely out of each crewman's escape route as best shown in FIG. 5.

In this invention, it is unnecessary to cut towline 48 or otherwise disconnect rocket 42 from the enclosure structure 22 after the enclosure structure has been extracted from its position on aircraft 20. Rocket 42 has enough propellant to carry enclosure structure 22 a sufficient distance away from aircraft 20 where it interferes neither with the rocket powered removal of each crewman nor with the deployment of the crewman's recovery parachute.

The rocket escape apparatus indicated at 38 is activated when the canopy has rotated about 45°. Apparatus 38 when applied to a Navy A3 aircraft also includes seat positioner devices such as unshown thrusters for seats 34 and 36. Seats 34 and 36 as well as seat 35 are all mounted on unshown carriages or guide rails and after the navigator in seat 35 is removed, seats 34—36 are all repositioned such that both the pilot and bombardier clear windshield 32.

The seat repositioning devices and rocket powered escape apparatus 38 do not form a part of this invention. It will be appreciated that once enclosure structure 22 is removed in the manner previously described to provide an opening for an upward escape of the crewmen, the crewmen may be removed in any suitable, conventional manner.

As best shown in FIG. 2, the portion of towline 48, which is stowed in compartment 24 and which is secured at one end to rocket 42, extends to and is attached to a splice fitting 94 sealed in window 81. An exteriorly disposed cable 95, forming a part of towline 48, is secured at one end to fitting 94 and at its other end to a bracket 96 which is fixed on the frame of enclosure structure 22.

The invention may be embodied in other specific forms without departing from the spirit or essential characteristics thereof. The present embodiment is therefore to be considered in all respects as illustrative and not restrictive.

I claim:

1. In an apparatus for removing an enclosure structure from a vehicle wherein said enclosure structure forms a part of said vehicle and delimits a load-receiving compartment in said vehicle, said apparatus comprising a rocket mounted in said vehicle, motion-transmitting means connecting said rocket to said enclosure structure, means for selectively providing a rocket egress opening in said enclosure structure, and means for forcibly launching said rocket for flight through said egress opening and away from said vehicle and for igniting said rocket for continuing said flight away from said vehicle, said rocket during said flight applying a force through the connection provided by said motion-transmitting means to carry said enclosure structure away from said vehicle, thereby providing an opening for removing a load in said compartment, said motion-transmitting means comprising an extensible towline, and said rocket, during said flight, extending said towline to a tensioned, motion-transmitting condition for extracting said enclosure structure from its position on the vehicle.

2. The apparatus defined in claim 1 wherein said rocket egress opening forming means comprises means for cutting out a predetermined one of a plurality of windows forming a part of said enclosure structure.

3. In an apparatus for removing an overhead crew enclosure structure from a vehicle wherein said enclosure structure is mounted on said vehicle and delimits a crew compartment in the vehicle, said apparatus comprising a rocket mounted in said vehicle, motion-transmitting means connecting said rocket to said enclosure structure, means for selectively forming a rocket egress opening in said enclosure structure at a predetermined location relative to the position of said rocket in the vehicle, and means for forcibly launching said rocket for flight through said egress opening and away from said vehicle and for igniting said rocket for continuing said flight away from the vehicle, said rocket during said flight applying a force through the connection provided by said motion-transmitting means to carry said enclosure structure away from said vehicle, thereby providing an escape opening for an occupant of said compartment, said motion-transmitting means comprising an extensible towline connected between said rocket and said enclosure structure, and said rocket, during said flight, extending said towline to a tensioned motion-transmitting condition for extracting said enclosure structure from its position on said vehicle.

4. The apparatus defined in claim 3 wherein means responsive to a predetermined extension of said towline at least partially frees said enclosure structure from said vehicle.

5. The apparatus defined in claim 3 wherein said rocket is of the tractor type having nozzle means only adjacent to its forward end, and wherein said towline is connected to the aft end of said rocket remote from said nozzle means.

6. The apparatus defined in claim 5 wherein said means for igniting said rocket comprises means for effecting ignition of the rocket fuel only after said rocket leaves said vehicle.